United States Patent
Yang

(10) Patent No.: US 7,990,466 B2
(45) Date of Patent: Aug. 2, 2011

(54) METHOD OF AUTO-RETRACTING LENS OF IMAGE CAPTURE APPARATUS AND CONTROL SYSTEM USING THE SAME

(75) Inventor: Ching-Lung Yang, Miaoli County (TW)

(73) Assignee: Altek Corporation, Hsinchu (TW)

( * ) Notice: Subject to any disclaimer, the term of this patent is extended or adjusted under 35 U.S.C. 154(b) by 353 days.

(21) Appl. No.: 12/427,114

(22) Filed: Apr. 21, 2009

(65) Prior Publication Data

US 2010/0123789 A1    May 20, 2010

(30) Foreign Application Priority Data

Nov. 19, 2008 (TW) .............................. 97144663 A

(51) Int. Cl.
H04N 5/225 (2006.01)
H04N 9/04 (2006.01)
G03B 5/02 (2006.01)
G03B 17/00 (2006.01)

(52) U.S. Cl. ................... 348/372; 348/335; 348/207.99; 396/349; 396/301

(58) Field of Classification Search .................. 348/372, 348/335, 207.99; 396/348–349, 301–303
See application file for complete search history.

(56) References Cited

U.S. PATENT DOCUMENTS

| 6,233,016 | B1* | 5/2001 | Anderson et al. ............. | 348/372 |
| 7,342,611 | B2* | 3/2008 | Larner et al. .................. | 348/372 |
| 7,389,441 | B2* | 6/2008 | Horii ............................. | 713/340 |
| 7,742,096 | B2* | 6/2010 | Murakami ..................... | 348/335 |
| 7,760,451 | B2* | 7/2010 | Hou et al. ..................... | 359/822 |
| 2003/0142228 | A1* | 7/2003 | Flach et al. .................. | 348/335 |

FOREIGN PATENT DOCUMENTS

TW    I299813    8/2008

* cited by examiner

Primary Examiner — Nhan T Tran
(74) Attorney, Agent, or Firm — Rabin & Berdo, P.C.

(57) ABSTRACT

A method of auto-retracting a lens of an image capture apparatus and a control system using the same are applied to an image capture apparatus with a retractable lens. The method includes the following steps. A hardware circuit of the image capture apparatus detects whether an abnormal power failure event occurs or not. The hardware circuit performs a re-boot procedure when detects that the abnormal power failure event occurs. After the hardware circuit performs the re-boot procedure, software in the image capture apparatus utilizes residual power only to perform a control procedure of retracting the lens. After the retractable lens is detected to have been retracted into the image capture apparatus, the software controls the image capture apparatus to be powered off.

9 Claims, 3 Drawing Sheets

METHOD OF AUTO-RETRACTING LENS OF IMAGE CAPTURE APPARATUS AND CONTROL SYSTEM USING THE SAME

CROSS-REFERENCE TO RELATED APPLICATIONS

This non-provisional application claims priority under 35 U.S.C. §119(a) on Patent Application No(s). 097144663 filed in Taiwan, R.O.C. on Nov. 19, 2008 the entire contents of which are hereby incorporated by reference.

BACKGROUND OF THE INVENTION

1. Field of Invention

The present invention relates to a lens control method and a control system thereof, in particular, to a control method of auto-retracting a lens of an image capture apparatus and a control system using the same.

2. Related Art

An image capture apparatus (e.g., a digital camera) is a novel product combined with optical, fine mechanical, and electronic technologies, which converts an image captured by a lens of a camera into a digital image signal by a charge coupled device (CCD) and stores the digital image signal into a storage medium, such as a magnetic disk, optical disk, or IC memory card, through being processed by electronic circuits. Furthermore, the image may also be displayed on all kinds of displays (e.g., a television or monitor) immediately, for performing various reuse functions of images, e.g., editing or modifying, so that it is fairly convenient and saves time and money.

As the digital camera has become a mainstream consumer electronic product in recent years, consumers have increasingly high requirements on the functions of the digital camera such as a high pixel, short film shooting function, large LCD display screen, large memory capacity, small volume, and small weight. In this case, it has become an important challenge for engineers in designing digital cameras to prolong the use and standby time of a battery.

Since there are various enterprises and brands of batteries used by the digital cameras, it requires to conduct a great deal of tests and complex estimations to predict whether the battery is out of power. However, the batteries have great variations and chemical formula of the batteries also changes rapidly, resulting in increasingly high complexity and high failure rate when predicting the residual power of the battery. As a result, it is a difficult task for estimating the residual power of the battery of the digital camera correctly. In a user's using experiences, the digital camera is often abnormally powered off when the battery runs out of power, and what's worse, the lens still remains un-retracted. In this case, it is rather inconvenient for the user to carry along the camera with the lens un-retracted, and the lens may even possibly suffer from damages due to being crashed.

Currently, in order to solve the above un-retracted problem of the lens resulted from running out of power, some power supply management designs involve raising a threshold value for the point of running out of power. In this way, the digital camera is ensured to be able to retract the lens with the residual power before the digital camera reaches the point of running out of power. Unfortunately, such power supply management designs further reduce the original available power capacity, thus sacrificing a number of available shots of the digital camera. Additionally, the relevant prior art concerning a power-saving mechanism of the digital camera can be obtained with reference to ROC Patent Publication No. I299813, which discloses a power-saving method of an image capture apparatus. The power-saving method omits the power consumption resulted from a standby mode and repeatedly retracting and un-retracting the lens, thus raising the number of shots of the image capture apparatus. However, a system which includes a control algorism and corresponding hardwares for auto-retracting the lens in the case of abnormal power failure is not disclosed.

Accordingly, how to provide a new technology for auto-retracting the lens in the case of abnormal power failure becomes one of the problems to be urgently solved by the research personnel.

SUMMARY OF THE INVENTION

In view of the above problems, the present invention is directed to a control method of auto-retracting a lens of an image capture apparatus and a control system using the same, in which hardware and software controlling the image capture apparatus utilize a residual power to perform a re-boot procedure and a lens retracting procedure, when an abnormal power failure occurs, thereby ensuring the security of the lens while maintaining the maximum utilizing efficiency of the electric quantity of the battery.

Accordingly, the present invention provides a control method of auto-retracting a lens of an image capture apparatus, which is applied to an image capture apparatus with a retractable lens. The control method includes the following steps. Firstly, a hardware circuit of the image capture apparatus detects whether an abnormal power failure event occurs. Next, the hardware circuit performs a re-boot procedure when detecting that the abnormal power failure event occurs. Then, after the hardware circuit performs the re-boot procedure, software in the image capture apparatus utilizes a residual power to perform a control procedure of retracting the lens. Finally, after the retractable lens is detected to have been retracted into the image capture apparatus, the software controls the image capture apparatus to be powered off.

Additionally, the present invention provides a control system of an image capture apparatus, which is adapted to control a retractable lens of an image capture apparatus. The control system includes: a hardware circuit, equipped in the image capture apparatus for performing a re-boot procedure when detecting that an abnormal power failure event occurs to the image capture apparatus; and a software, installed in the image capture apparatus, for utilizing residual power only to perform a control procedure of retracting the lens after the hardware circuit performs the re-boot procedure, and for controlling the image capture apparatus to be powered off after the retractable lens is detected to have been retracted into the image capture apparatus.

Through the control method of auto-retracting the lens of the image capture apparatus and the control system using the same, hardware and software controlling the image capture apparatus utilize the residual power to perform a re-boot procedure and a lens retracting procedure when an abnormal power failure occurs, which ensures the security of the lens while maintaining the maximum utilization efficiency of the electric quantity of the battery, further reduces the time and cost spent by engineers in estimating and adjusting the electric quantity of the battery, reduces a great deal of batteries used in the tests of estimating the electric quantity, lowers the complexity of an electric quantity estimation program, reduces the time cost for maintaining the program, and increases the number of available shots of the digital camera.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

A method of auto-retracting a lens of an image capture apparatus according to the present invention is applied to an image capture apparatus (for example, image input device e.g., digital camera) with a retractable lens. The method of auto-retracting the lens of the image capture apparatus in the present invention is relevant to an electric quantity of a battery of the image capture apparatus. A common type of batteries currently used in the image capture apparatus is No. 5 batteries: alkaline batteries, lithium batteries, nickel batteries (primary battery); nickel-cadmium batteries, nickel-hydrogen batteries (secondary battery); lithium batteries (primary batteries); and lithium ion secondary batteries (secondary battery). Accordingly, an electric quantity of the battery is first defined hereinafter.

Figure 1:
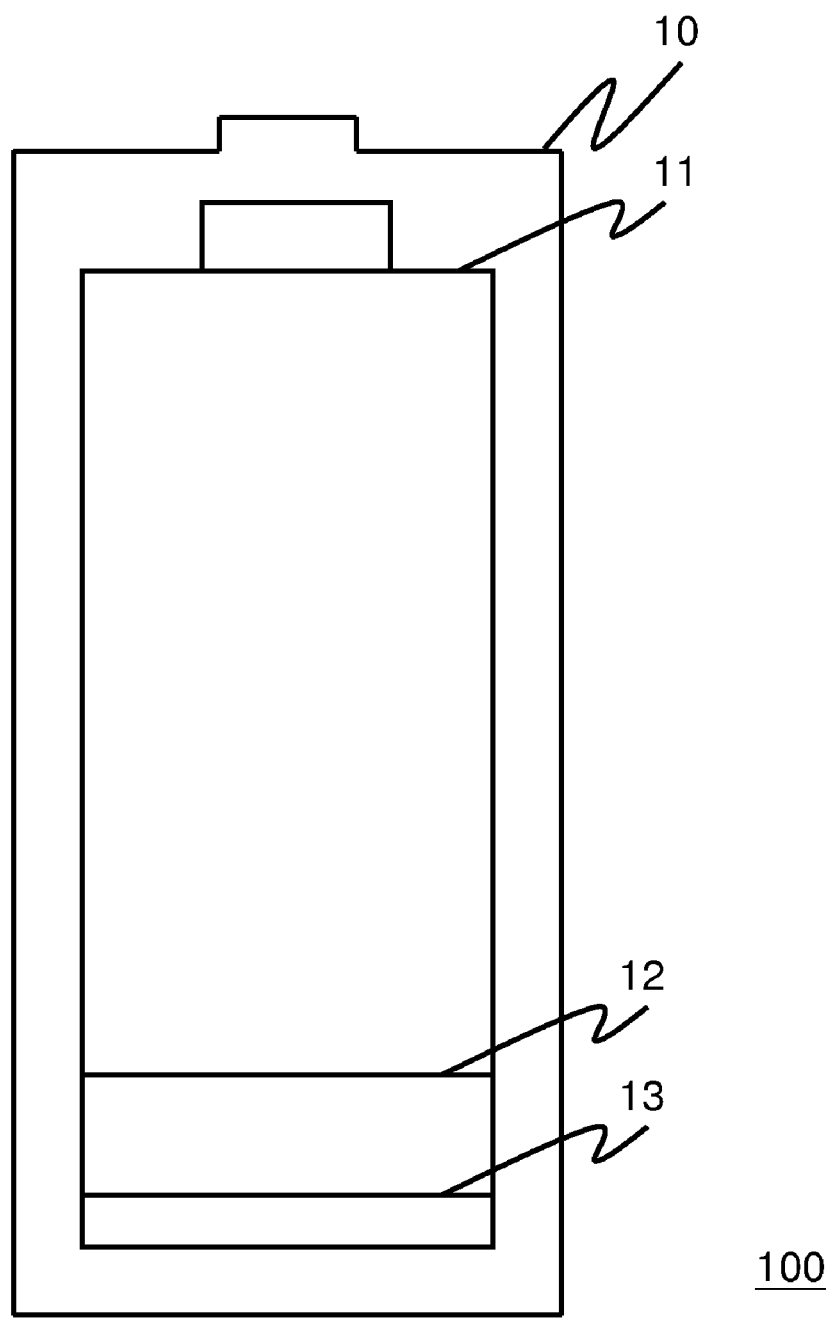
FIG. 1 is a schematic view of an electric quantity of a battery according to the present invention.

FIG. 1 is a schematic view of an electric quantity of a battery according the present invention. Referring to FIG. 1, an electric quantity of a battery 100 of the present invention is classified into a design quantity 10, a saturation quantity 11, a warning quantity 12, and a low quantity 13.

The design quantity 10 refers to an energy produced after an active substance within the battery 100 reacts completely.

The saturation quantity 11 refers to an electric capacity that can be output actually after the battery 100 is charged, which generally takes A/h as the unit.

The warning quantity 12 refers to a residual power of the battery 100 that is insufficient for the image capture apparatus to continue working for a long time, and once detecting the warning quantity 12, a power supply management mechanism in the image capture apparatus reminds a user with a message that the battery is running out of power.

The low quantity 13 refers to a residual power of the battery 100 that is insufficient for powering all circuits of the image capture apparatus (for example, a lens drive motor, liquid crystal display, backlight system, storage system, flashlight system, CCD, system control device, user input/output interface, main developing device, auto-focus system, and the like) for operation. Accordingly, when the battery 100 reaches the low quantity 13, an abnormal power failure easily occurs to the image capture apparatus during an operational process.

Figure 2:
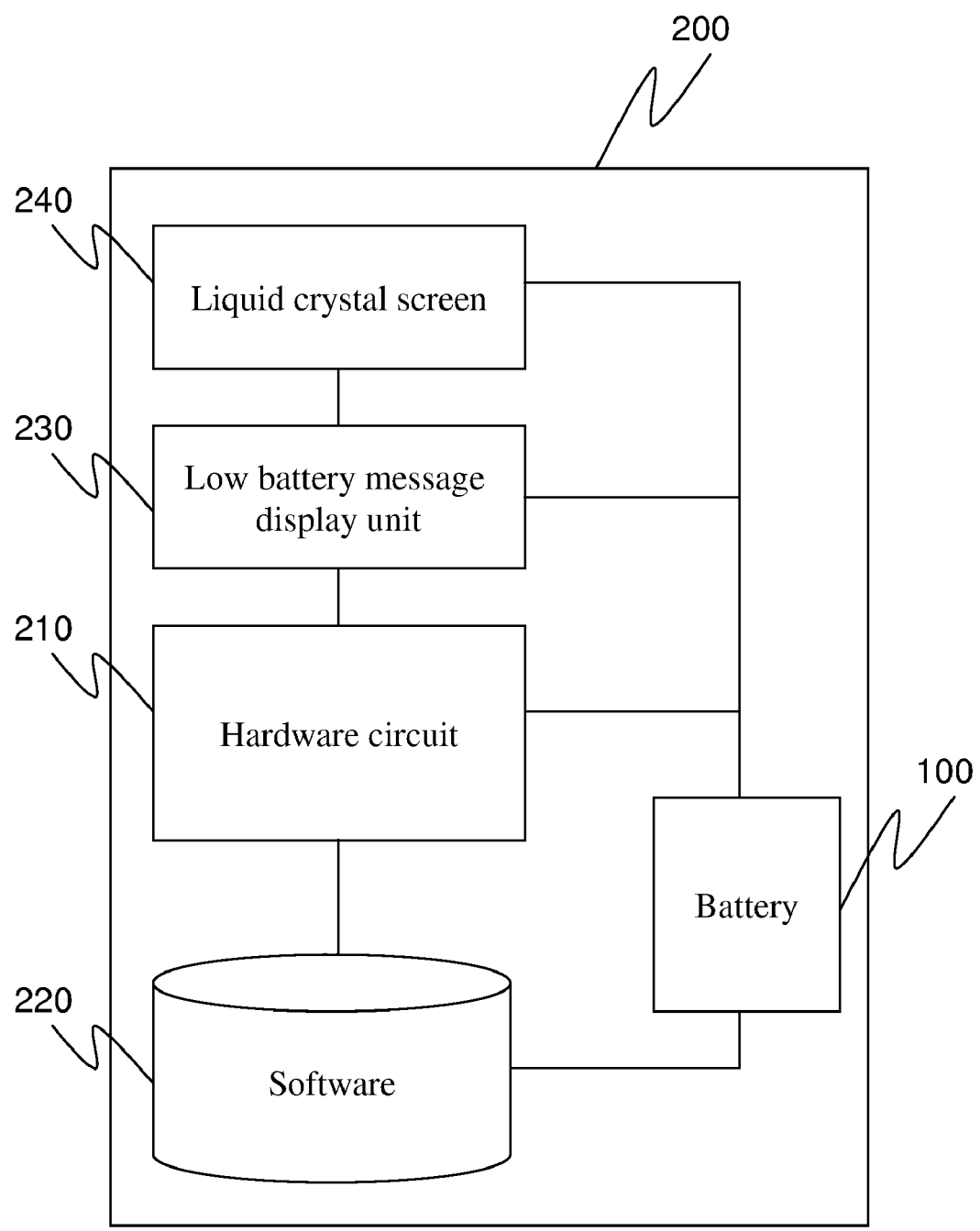
FIG. 2 is a block diagram of a control system of an image capture apparatus according to the present invention.

FIG. 2 is a block diagram of a control system of an image capture apparatus according to the present invention. Referring to FIG. 2, a control system of an image capture apparatus 200 according to the present invention is adapted to control a retractable lens (not shown) of the image capture apparatus 200. The control system of the image capture apparatus 200 includes a hardware circuit 210 and software 220.

The hardware circuit 210 is equipped in the image capture apparatus 200. The hardware circuit 210 is used to perform a re-boot procedure when detecting an abnormal power failure event occurs to the image capture apparatus 200. The hardware circuit 210 includes a lens drive circuit, a lens position sensor, and a power supply detecting circuit. Additionally, a low battery message display unit 230 is disposed on a surface of the image capture apparatus 200, so as to convey a message that the image capture apparatus 200 is low battery. The low battery message display unit 230 may be, for example, a light-emitting diode (LED). A liquid crystal screen 240 is further disposed in the image capture apparatus 200. The low battery message display unit 230 also generates a text message, and the message that the image capture apparatus 200 is low battery is displayed in the liquid crystal screen 240.

The software 220 is installed in the image capture apparatus 200. The software 220 utilizes the residual power of the battery 100 only to perform a control procedure of retracting the lens when the hardware circuit 210 performs the re-boot procedure, and controls the image capture apparatus 200 to be powered off after the retractable lens is detected to have been retracted into the image capture apparatus 200. The software 220 is also provided for performing a plurality of general operation procedures (for example, a noise filtering procedure, auto-focusing procedure, lens retracting procedure, real-time red eye removal procedure, video image capturing procedure, video image stabilizing procedure, and image editing/processing procedure).

Figure 3:
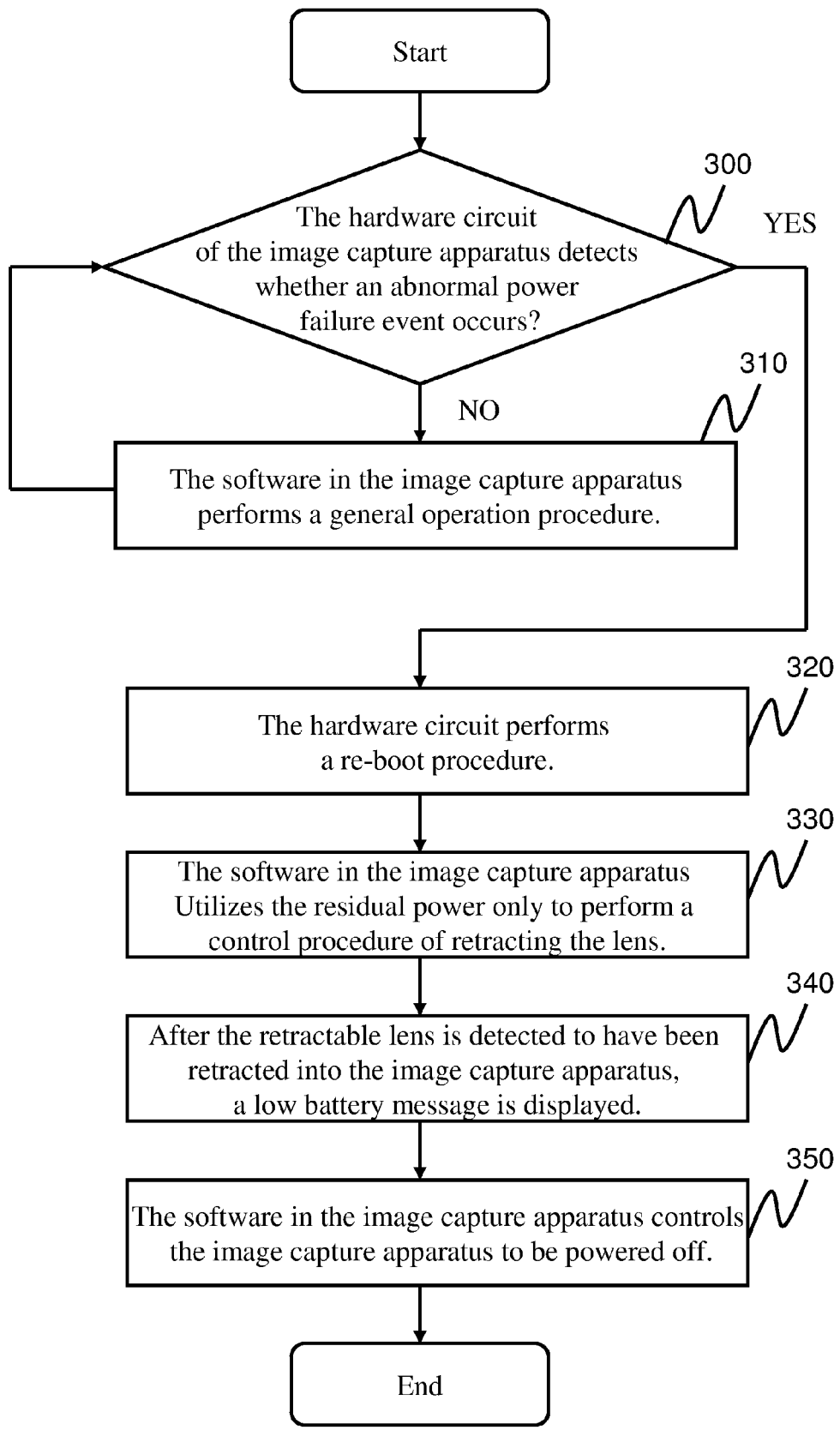
FIG. 3 is a flow chart of a method of auto-retracting a lens of an image capture apparatus according to the present invention.

FIG. 3 is a flow chart of a method of auto-retracting a lens of an image capture apparatus according to the present invention. Referring to FIG. 3, a method of auto-retracting a lens of an image capture apparatus according to the present invention includes the following steps.

First, since circuits that need to be powered in the image capture apparatus 200 (shown in FIG. 2) include a lens drive motor, liquid crystal display, backlight system, storage system, flashlight system, CCD, system control device, user input/output interface, main developing device, auto-focus system, and the like, when the battery 100 reaches the low quantity 13 (shown in FIG. 1) or below the low quantity 13, the abnormal power failure may occur to the image capture apparatus 200.

At this time, although the image capture apparatus 200 is abnormally powered off, certain residual power still exists in the battery 100. Thus, the hardware circuit 210 of the image capture apparatus 200 detects whether an abnormal power failure event occurs or not (Step 300), in which the hardware circuit 210 determines whether the abnormal power failure event occurs to the image capture apparatus 200 or not by means of detecting whether the image capture apparatus 200 is powered off with the lens un-retracted.

When it is determined that the abnormal power failure event does not occur to the image capture apparatus 200, the software 220 in the image capture apparatus 200 performs a general operation procedure (Step 310), and the flow returns to Step 300. The general operation procedure may be, for example, the noise filtering procedure, auto-focusing procedure, lens retracting procedure, real-time red eye removal procedure, video image capturing procedure, video image stabilizing procedure, image editing/processing procedure, and the like.

When the hardware circuit 210 of the image capture apparatus 200 determines that the abnormal power failure event occurs, the hardware 210 performs a re-boot procedure (Step 320).

After the hardware circuit 210 performs the re-boot procedure, the software 220 in the image capture apparatus 200 utilizes the residual power only to perform a control procedure of retracting the lens (Step 330). The software 220 preferentially and uniquely performs the control procedure of retracting the lens once the image capture apparatus 200 is rebooted. In other words, the residual power of the battery 100 is mainly supplied to the system control device and the lens drive motor, instead of the remaining modules (for example, the liquid crystal display, backlight system, storage system, flashlight system, CCD, user input/output interface, main developing device, auto-focusing system, and the like), thereby retracting the lens into the image capture apparatus 200.

After the retractable lens is detected to have been retracted into the image capture apparatus 200, a low battery message is displayed (Step 340). The low battery message is presented through, for example, triggering a red LED, or conveys the message that the image capture apparatus 200 is low battery by the low battery message display unit 230. Furthermore, it is a sensor of the hardware circuit 210 that detects whether the retractable lens has been retracted into the image capture apparatus 200.

The software 220 in the image capture apparatus 200 controls the image capture apparatus 200 to be powered off (Step 350).

In summary, through the control method of auto-retracting the lens of the image capture apparatus and the control system using the same, hardware and software controlling the image capture apparatus utilize the residual power to perform a re-boot procedure and a lens retracting procedure when an abnormal power failure occurs, which ensures the security of the lens while maintaining the maximum utilization efficiency of the electric quantity of the battery, further reduces the time and cost spent by engineers in estimating and adjusting the electric quantity of the battery, reduces a great deal of batteries used in the tests of estimating the electric quantity, lowers the complexity of an electric quantity estimation program, reduces the time cost for maintaining the program, and increases the number of available shots of the digital camera.

What is claimed is:

1. A method of auto-retracting a lens of an image capture apparatus, applied to an image capture apparatus with a retractable lens, the method comprising:
    detecting whether an abnormal power failure event occurs or not by a hardware circuit of the image capture apparatus;
    performing a re-boot procedure by the hardware circuit when detecting that the abnormal power failure event occurs;
    after the hardware circuit performs the re-boot procedure, utilizing a residual power only to perform a control procedure of retracting the lens by software in the image capture apparatus; and
    after the retractable lens is detected to have been retracted into the image capture apparatus, controlling the image capture apparatus to be powered off by the software.

2. The method of auto-retracting a lens of an image capture apparatus as claimed in claim 1, wherein when the hardware circuit detects that no abnormal power failure event occurs, the software in the image capture apparatus performs a general operation procedure.

3. The method of auto-retracting a lens of an image capture apparatus as claimed in claim 2, wherein the general operation procedure comprises a noise filtering procedure, an auto-focusing procedure, a lens retracting procedure, a real-time red eye removal procedure, a video image capturing procedure, a video image stabilizing procedure, and an image editing/processing procedure.

4. The method of auto-retracting a lens of an image capture apparatus as claimed in claim 1, wherein after the step of detecting that the retractable lens has been retracted into the image capture apparatus, the method further comprises a step of displaying a low battery message.

5. A control system of an image capture apparatus, adapted to control a retractable lens of an image capture apparatus, comprising:
    a hardware circuit, equipped in the image capture apparatus, for performing a re-boot procedure when detecting that an abnormal power failure event occurs to the image capture apparatus; and
    a software, installed in the image capture apparatus, for utilizing a residual power only to perform a control procedure of retracting the lens after the hardware circuit performs the re-boot procedure, and for controlling the image capture apparatus to be powered off after the retractable lens is detected to have been retracted into the image capture apparatus.

6. The control system of an image capture apparatus as claimed in claim 5, wherein the software is further provided for performing a plurality of general operation procedures.

7. The control system of an image capture apparatus as claimed in claim 6, wherein the general operation procedures comprise a noise filtering procedure, an auto-focusing procedure, a lens retracting procedure, a real-time red eye removal procedure, a video image capturing procedure, a video image stabilizing procedure, and an image editing/processing procedure.

8. The control system of an image capture apparatus as claimed in claim 5, further comprising a low battery message display unit, disposed on a surface of the image capture apparatus, for conveying a message that the image capture apparatus is lower battery.

9. The control system of an image capture apparatus as claimed in claim 8, wherein a liquid crystal screen is disposed in the image capture apparatus, and the low battery message display unit displays the message that the image capture apparatus is lower battery in the liquid crystal screen.

* * * * *